United States Patent [19]
Newbould et al.

[11] 3,893,969
[45] July 8, 1975

[54] REINFORCED POLYAMIDE MOLDING COMPOSITION

[75] Inventors: John Newbould, Sterling Heights; Elio Eusebi, Troy, both of Mich.

[73] Assignee: General Motors Corporation, Detroit, Mich.

[22] Filed: Mar. 29, 1974

[21] Appl. No.: 456,182

[52] U.S. Cl. ............................ 260/37 EP; 260/37 N
[51] Int. Cl. ............................................ C08g 51/04
[58] Field of Search ........... 260/37 N, 832 P, 37 EP

[56] References Cited
UNITED STATES PATENTS
3,806,489   4/1974   Rieux et al. ..................... 260/37 N Primary Examiner—Lewis T. Jacobs
Attorney, Agent, or Firm—George Grove

[57] ABSTRACT

A filled and reinforced polyamide composition is formed by using an epoxy resin to chemically and physically couple a mineral filler to the polyamide matrix. The subject coupling agents have the high temperature stability desired in the processing of polyamide resins.

3 Claims, No Drawings

REINFORCED POLYAMIDE MOLDING COMPOSITION

FIELD OF THE INVENTION

This invention relates to a filled and reinforced polyamide composition and, more specifically, to the use of epoxy resins as the means to physically and/or chemically couple a mineral filler to a polyamide matrix.

BACKGROUND OF THE INVENTION

Many of the physical properties of polyamide resins can be improved by the incorporation of suitable reinforcing fillers. A key to developing such a composition is to effectively link or couple the filler to the polyamide matrix. Without this bond the addition of the filler seriously reduces the tensile strength of the resin at relatively low concentrations.

An effective coupling agent is one that will chemically react with both the polyamide and with the inorganic fillers. It must possess both a chemical moiety which is compatible with and able to interact with the polymer, and an additional and separate chemical moeity which is compatible with and able to react with a functionality on the surface of the filler.

Certain organosilanes have been used as coupling agents. Reinforced polymer compositions which employ organosilane coupling agents are described in U.S. Pat. No. 3,328,339 issued to Tierney and U.S. Pat. No. 3,419,517 issued to Hedrick. Because of the rather complicated chemical structure of the disclosed coupling agents and of organosilanes, in general, they are relatively expensive compounds. In addition to their cost there are several other disadvantages in using the organosilane coupling agents. For example, the aminosilanes present the handling problems associated with relatively nocuous, volatile liquids, and the manufacturers specifically warn the user about their irritating properties.

OBJECTS OF THE INVENTION

It is an object of this invention to provide a filled and reinforced polyamide composition wherein the reinforcing filler is coupled to the polyamide matrix by an epoxy resin, and a method of preparing such reinforced compositions.

SUMMARY OF THE INVENTION

In accordance with a preferred embodiment of our invention this and other objectives are accomplished by first providing a dry mineral filler which has a suitable, predetermined particle size and shape and which has reactive hydroxyl functionalities on its surface. For example, a particulate silica filler having an average particle size within the range of 2 to 10 microns is suitable.

The filler particles are pretreated by uniformly coating them with a mixture containing from 0.3 percent to 2 percent by weight, based on the filler of an uncured epoxy resin and approximately the stoichiometric portion of a curing agent such as N, N' diethyl-1, 3-propanediamine. To insure a relatively uniform coating, the epoxy resin and the curing agent are initially dissolved or dispersed in a suitable solvent such as acetone which must be evaporated before the coupling agent is cured. The preferred epoxy resin is characterized by its solubility in acetone and a relatively low molecular weight in the range of 300 to 3,000.

In general, the epoxy resin molecule is characterized by the reactive epoxide or ethoxyline groups

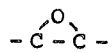

and when crosslinking is accomplished through these groups (or through hydroxyls or other groups present), an inert and tough solid is formed. In its simplest and idealized form, the epoxy molecule is represented by the diglycidyl ether of bisphenol A, which has the following formula:

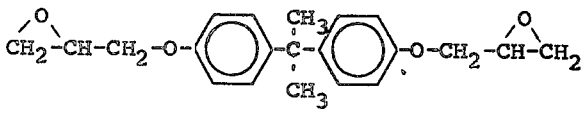

The high-viscosity liquid and the solid resins, which are preferred in the subject coupling agent application, are predominantly composed of more highly polymerized products which are considered homologs of the diglycidyl ether of bisphenol A.

In accordance with our invention the coupling agent is to be chemically bonded to the filler. This is accomplished by heating the coated filler to a temperature within a range of from 160° to 180° C. for a period ranging up to 60 minutes; this allows the curing agent to open the epoxide ring and to cure or crosslink the epoxy resin. During this reaction hydroxyl groups are formed on the epoxy resin molecules. Some of these hydroxyl groups then immediately proceed to participate in a condensation reaction with the reactive hydroxyl groups on the surface of the filler. This establishes the chemical bond between the coupling agent and the filler.

As is known, suitable curing agents or hardeners for epoxy resins comprise di- or polyfunctional materials capable of crosslinking the epoxy resin by reacting with its epoxide groups. More specifically, the curing agent opens the epoxide ring and forms a covalent bond with one of the carbon atoms initially in the epoxide ring; concurrently, a hydroxyl group is generally formed on the carbon-oxygen members of the epoxide ring during this ring-opening reaction. Diamines and acid anhydrides are typically used as curing agents in this application.

As used herein, the term "cure" is intended to encompass both the ring opening reaction which generates the hydroxyl groups and the crosslinking reactions between separate epoxide groups. Thus an uncured epoxy resin has a relatively low molecular weight and many unreacted epoxide groups. Upon curing epoxide groups are opened and hydroxyl groups formed thereby react with the reactive hydroxyl functionalities on the surface of the mineral filler. Typically, this is a condensation reaction yielding a silicon-oxygen-carbon link between the filler and the epoxy resin. It is these bonds, formed between the hydroxyl groups on the filler surface and the hydroxyl groups generated on the coupling agent molecule when the epoxide ring is opened, which establish the chemical bond between the filler and the coupling agent. The remaining hydroxyl groups and other polar groups which may be attached to either the epoxy resin or the hardener are capable of interacting with the polyamide matrix and of forming hydrogen bonds between the coated filler and the amide groups on the polymer.

The next step in forming the subject reinforced composition is to blend from 5 to 220 parts by weight of the coated filler with 100 parts by weight of nylon 6 (polycaprolactam) molding resin. Typically, the blending is carried out in two separate operations. The first stage is commonly done in a mixer at room temperature to commingle the coated filler particles and the nylon resin particles. The second stage is carried out in an extruder at relatively high temperatures. The extrusion process thoroughly disperses the filler throughout the polymer melt and leads to the formation of the hydrogen bonds between the hydroxyl groups or other polar groups on the coupling agent, and the polyamide matrix.

The high temperature stability of the subject coupling agents is a distinct advantage in polyamide compositions which require extremely high processing temperatures. Another exemplary desirable property of the disclosed reinforced composition is shown in Table I which compares the tensile strength of various filled polyamide compositions containing 40 percent by weight of a particulate silica. For example, the tensile strengths of (1) the virgin nylon 6, (2) filled compositions with no coupling agent, (3) and (4) filled and reinforced compositions coupled with various agents including the subject epoxy resin are listed. Nylon 6 was the polyamide resin used in each example and the type and amount of filler were held constant. Furthermore, each composition was prepared in accordance with the respective preferred procedures.

TABLE I

| | Composition | Tensile Strength |
|---|---|---|
| | | psi |
| 1. | Nylon 6 (virgin) | 9,500 – 11,700 |
| 2. | Nylon 6 + 40% silica (no coupling agent) | 8,800 |
| 3. | Nylon 6 + 40% silica (silane coupling agent) | 12,109 |
| 4. | Nylon 6 + 40% silica (epoxy coupling agent) | 11,540 |

This and other features and advantages of this invention will be better understood in view of a detailed description thereof to include the specific examples.

DETAILED DESCRIPTION OF THE INVENTION

The coupling mechanism which binds the filler to the resin in the subject compositions depends on the creation of two separate chemical bonds; one between the filler and the coupling agent and the second between the coupling agent and the polyamide matrix. A condensation reaction between the hydroxyl groups which are generated on the coupling agent molecules during the curing reaction and the hydroxyl groups on the surface of the filler forms the chemical bond between the filler and the coupling agent. The chemical bond between the coupling agent and the polyamide matrix is often a hydrogen bond between the polar hydroxyl groups on the coupling agent which were generated during the curing reaction and the amide groups on the polymer matrix.

The efforts which produced this invention were directed by the above theory which is included herein to orient the reader; however, it is to be emphasized that the scope of this invention is not to be limited by this theory.

Suitable fillers for this application are those having reactive hydroxyl groups on their surfaces. By reactive hydroxyl groups, it is meant to include those groups which are capable of forming compounds such as (a) esters, if reacted with organic acids, (b) ethers, if reacted with alcohols, such as glycerol, (c) carbamates, if reacted with isocyanates, or (d) a silane derivative, if reacted with methyl trichlorosilane.

A variety of fillers having the reactive hydroxyl groups on the surfaces can be effectively coupled to the polyamide matrix by the subject epoxy resins. For example, silica, wollastonite (CaSiO$_3$) and glass beads are suitable filler materials. In addition, it is to be understood that other minerals may be pretreated in such a manner to create these reactive surface hydroxyl groups and are therefore to be considered within the scope of this invention.

In accordance with the subject invention the use of particulate fillers is preferred especially if relatively large filler concentrations are used. However, it is to be understood that the coupling mechanism disclosed herein is not dependent on any particular particle shape and, therefore, the scope of this patent is not to be so limited.

In the case of non-fibrous particulate fillers, suitable particle sizes for the practice of this invention may vary over the range of from 0.1 micron to 400 microns. The major limitations on the particle size and shape are imposed by processing requirements. The subject coupling agents are effective over the entire particle size range that is feasible to use in an extrusion or molding grade polyamide resin. Similarly, if fibers are used, as the reinforcing filler, the shape and size are again controlled by the processing requirements. However, as the following description indicates, the maximum physical properties of the subject composition will probably be achieved within a narrower range of particle size and shape.

In general, the subject coupling agents comprise any aromatic or aliphatic molecule which may contain one or more heteroatoms such as sulfur or nitrogen and which contain more than one epoxide group and which is capable of being converted into a useful thermosetting resin. Preferably, the epoxide rings include the terminal carbon atoms on each molecule as in this alpha position the epoxide linkage has the greatest reactivity. Specific examples of suitable coupling agents include the preferred bisphenol A/epichlorohydrin based epoxy resins, the epoxylated phenol-formaldehyde resins, the reaction products of epichlorohydrin and various hydroxy materials, such as resorcinol, hydroquinone, or glycols and the like. The following structural formula describes the class of materials suitable for this application:

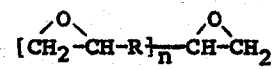

where R is any compatible aromatic or aliphatic group which may contain one or more heteroatoms such as sulfur or nitrogen and which has a molecular weight less than 9,000. R may contain any organic functionalities which will not react with the epoxide ring, and which has a suitable size and configuration to sterically allow the formation of the desired hydrogen bonds. The molecular weight of the epoxy resin should be within this range to facilitate the processing of the material. If the molecular weight exceeds 9,000, it becomes difficult to uniformly distribute the resin over the surface of the filler. It is also important that the epoxy resin be relatively free of crosslinks when it is initially blended with the filler.

Typically, the higher molecular weight epoxy resins are formed by reacting epichlorohydrin and bisphenol A in the presence on an excess of caustic and the general formula of such a resin is

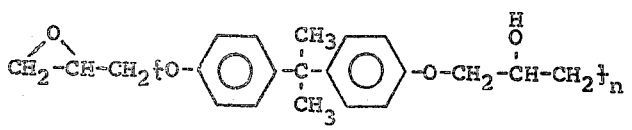

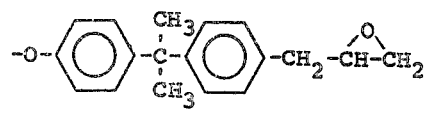

where $n$ has a value such that the resin has a molecular weight within the desired range.

Suitable curing agents for this invention include any di- or polyfunctional material capable of reacting with and thereby crosslinking the subject coupling agent and forming hydroxyl groups by reacting with the epoxide groups. The three most typical examples are the diamines, the polyamines, and compounds having an acid anhydride functionality. Specific examples include triethylene tetramine, diethylaminopropylamine, a methylated maleic adduct of methyl pentadiene known commercially as Nadic methyl anhydride, methylene bisdianiline, and various polyamines or polyamide compositions. It should be noted that accelerators, such as benzyl dimethylamine, may be added to increase the rate of reaction and reduce the cure time.

It should also be understood that a monofunctional material such as benzyl amine may be used to open the epoxide rings and generate the hydroxyl groups which are necessary to bond the coupling agent to the filler and to the polymer matrix. However, if such a material is used the epoxy resin will not be crosslinked.

The curing agent is to be added to the epoxy resin in proportions near the stoichiometrically required to react each of the epoxide groups. For example, if there are two epoxide linkages on each resin molecule and two reactive functionalities on the curing agent molecule, then the two will be blended at a 1:1 mole ratio. However, it is to be understood that a moderate excess of either component may be used to control the reaction rate or for other purposes; for example, from one half to twice the stoichiometric amounts would be suitable. Such a variance does not destroy the capacity of the resin to adequately couple the filler to the polyamide matrix. In each of the following examples near stoichiometric proportions were used.

In accordance with this invention a suitable reinforced polyamide molding composition may be formed by first providing a fibrous or particulate mineral filler, having reactive hydroxyl groups on the surface, and then pretreating that filler by mixing it thoroughly and coating it with from 0.1 percent to 5 percent by weight, preferably 0.5 percent, of an epoxy resin dissolved with a suitable curing agent in a solvent. After thoroughly blending and drying this mixture, the coated filler is then preferably heated to a temperature within a suitable range of from 150° to 220° C., preferably 170° C., for a period of time within a suitable range of from ½ minute or less to 60 minutes.

This coated filler is then blended with a polyamide resin, preferably nylon 6, at a concentration within a suitable range from about 5 percent to 70 percent by weight, based on the total composition, preferably about 40 percent. The components are then integrally mixed by an extrusion process with a melt temperature within the suitable range of from 250° to 330° C., and then granulated to form a molding grade resin.

EXAMPLE 1

Sixty parts by weight of a nylon 6 molding grade resin, Plaskon XP-607, which is marketed by Allied Chemical Company, were mixed with 40 parts by weight of a particulate silica filler, which is marketed by the Malvern Mineral Company under the trade name Novacite. The average particle size was in the range of 4 to 6 microns. The average size is defined as that mesh size through which 50 percent of the filler would pass. This filled composition which contained no coupling agent was extruded at a melt temperature of about 500° F. The extrudate was granulated and then injection molded into ASTM test parts which were tested in the dry, as-molded condition. A tensile strength of 8,750 psi was obtained with an elongation at break of 2.6 percent and an unnotched Izod impact strength of 6.3 ft./lbs.

EXAMPLE 2

Two pounds (908 grams) of the particulate filler, of the type used in Example 1, were dried and then coated with a liquid, bisphenol A/epichlorohydrin, epoxy resin marketed by Dow Chemical Co. under the trade name DER 331. This resin has a molecular weight of about 400 and a viscosity of from 11,000 to 16,000 centipoises at 25° C. Methylene bisdianiline served as the curing agent. In this particular composition near stoichiometric amounts of 5.4 grams of the epoxy resin and 1.4 grams of the curing agent were used.

The epoxy resin and the curing agent were dissolved in 120 milliliters of acetone, and this solution was then vigorously stirred with the filler in a Henschel mixer. The solvent was then evaporated and the resin was cured by heating it to 350° F. for 15 minutes.

The treated filler was then mixed with Plaskon XP-607 and extruded, granulated and then injection molded into ASTM test samples. The tensile strength of these samples was 11,540 psi, the elongation at break was 3.9 percent and the unnotched Izod impact strength was 11 ft./lbs.

EXAMPLE 3

The filler used in this and each of the following examples was the particulate silica used in Example 2. Using the procedures defined in Example 2, the silica filler was coated with 1 percent by weight, based on the filler, of a bisphenol A/epichlorohydrin epoxy resin marketed by Shell under the designation Epon 826; this was cured by N, N' diethyl-1, 3-propanediamine. Six parts of the curing agent were used for each 100 parts of resin. The tensile strength of samples molded from this filled and reinforced composition which contained 40 percent by weight of the filler was 11,400 psi.

EXAMPLE 4

The epoxy coupling agent used in this example was an epoxylated phenol-formaldehyde resin marketed by Dow Chemical Co. under the designation DEN 438-A-85; 39 parts by weight of this resin was cured by 28 parts by weight of Nadic methyl anhydride, 0.5 percent by weight, based on the filler, of N, N' dimethylbenzylamine was used as an accelerator. One filler sample was treated with 0.5 percent of this coupling agent and another sample was treated with 1 percent of this coupling agent.

Test samples molded from the composition containing 40% by weight of the silica filler which had been treated with 5% by weight, based on the filler, of the Novolac coupling agent had a tensile strength of 11,550 psi. Comparatively, the samples molded from the composition containing the filler which had been treated with 1% of the Novolac showed no significant improvement as the tensile strength measured at 11,480 psi.

EXAMPLE 5

The coupling agent used in this example was an aromatic amine cured bisphenol A/epichlorohydrin epoxy resin. The specific curing agent used was methylene bisdianiline. More specifically, the coupling agent consisted of 125 parts by weight of a solid epoxy marketed by Dow Chemical Co. under the designation DEN 661-1480. This resin melts within the range of 74° to 80° C. and the epoxide equivalent is within the range of 450 to 525. 105 parts by weight of the curing agent was used. Test samples molded from a composition containing 40 percent by weight of the silica filler which had been treated in accordance with the procedures outlined in Example 2 with 1 percent by weight of this coupling agent, had a tensile strength of 11,700 psi.

EXAMPLE 6

The coupling agent used in this example consisted of 50 parts by weight of a bisphenol A/epichlorohydrin epoxy resin which was cured with 50 parts by weight of a polyamide resin. This particular polyamide curing agent is produced by the Shell Chemical Corporation under the trade name "Epon V40." Using the preparation procedures described in Example 2, the curing agent was blended into the filler at a concentration of 1% by weight. The final molding composition, which 40 percent by weight of the silica filler, had a tensile strength of 11,100 psi.

While our invention has been described in terms of certain specific examples, it will be appreciated that other forms thereof could readily be adopted by one skilled in the art. Therefore, the scope of our invention is not to be limited to the specific embodiments illustrated.

What is claimed is:

1. A filled and reinforced polyamide composition comprising, by weight, 100 parts of a polyamide resin and from 5 to 220 parts of a finely divided filler dispersed therethrough, said filler being characterized by reactive surface hydroxyl groups, the particles of said filler being coated with the reaction product of from 0.1 percent to about 5 percent by weight, based on said filler, of an initially uncured, acetone soluble epoxy resin and an epoxy curing agent, said reaction product in said composition being chemically combined with the said filler particles by reaction with said hydroxyl groups.

2. A filled and reinforced polycaprolactam molding composition comprising, by weight, 100 parts of a polycaprolactam resin and from 5 to about 220 parts of a particulate filler dispersed therethrough, said filler particles having reactive hydroxyl groups on the surfaces thereof and said particles being coated with the reaction product of from 0.1% to about 5% by weight, based on said filler, of an initially uncured, acetone soluble epoxy resin and from one-half to twice the stoichiometrically required amount of an epoxy curing agent, said epoxy resin being of the type prepared from epichlorohydrin and bisphenol-A, said reaction product being chemically combined with said filler particles by reaction with said hydroxyl groups.

3. A method of forming a filled and reinforced polyamide composition, comprising:
   a. providing 100 parts by weight of a polyamide resin,
   b. providing from 5 to 220 parts by weight of a finely divided mineral filler having reactive hydroxyl functionalities on its surface,
   c. thoroughly mixing and coating said filler with a mixtue comprising from 0.1% to 5% by weight, based on said filler, of an uncured epoxy resin and from one-half to twice the stoichiometrically required amount of epoxy curing agent, said mixture being initially dissolved in an organic solvent to facilitate said coating,
   d. drying said coated filler to remove said solvent,
   e. baking the coated filler at a temperature in the range of 150° to 220° C. for a time up to 60 minutes to cure said epoxy resin with said curing agent, and to chemically combine said cured resin with said hydroxyl functionalities on the surface of said filler,
   f. thoroughly blending said resin and said coated filler, and
   g. extruding and chopping the blend to mix said resin and said filler to form a filled and reinforced thermoplastic molding composition.

* * * * *